July 29, 1941.  M. M. BORDEN ET AL  2,250,700
AIR-OPERATED METER
Filed July 16, 1938  4 Sheets-Sheet 3
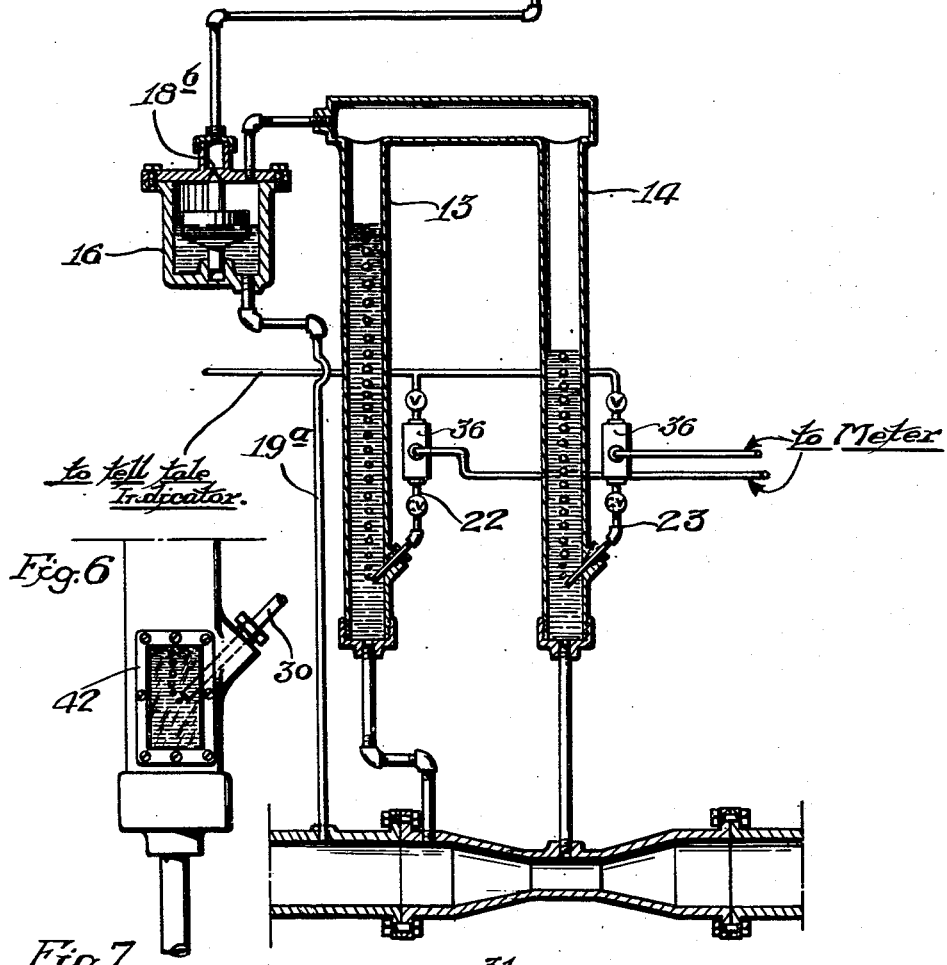

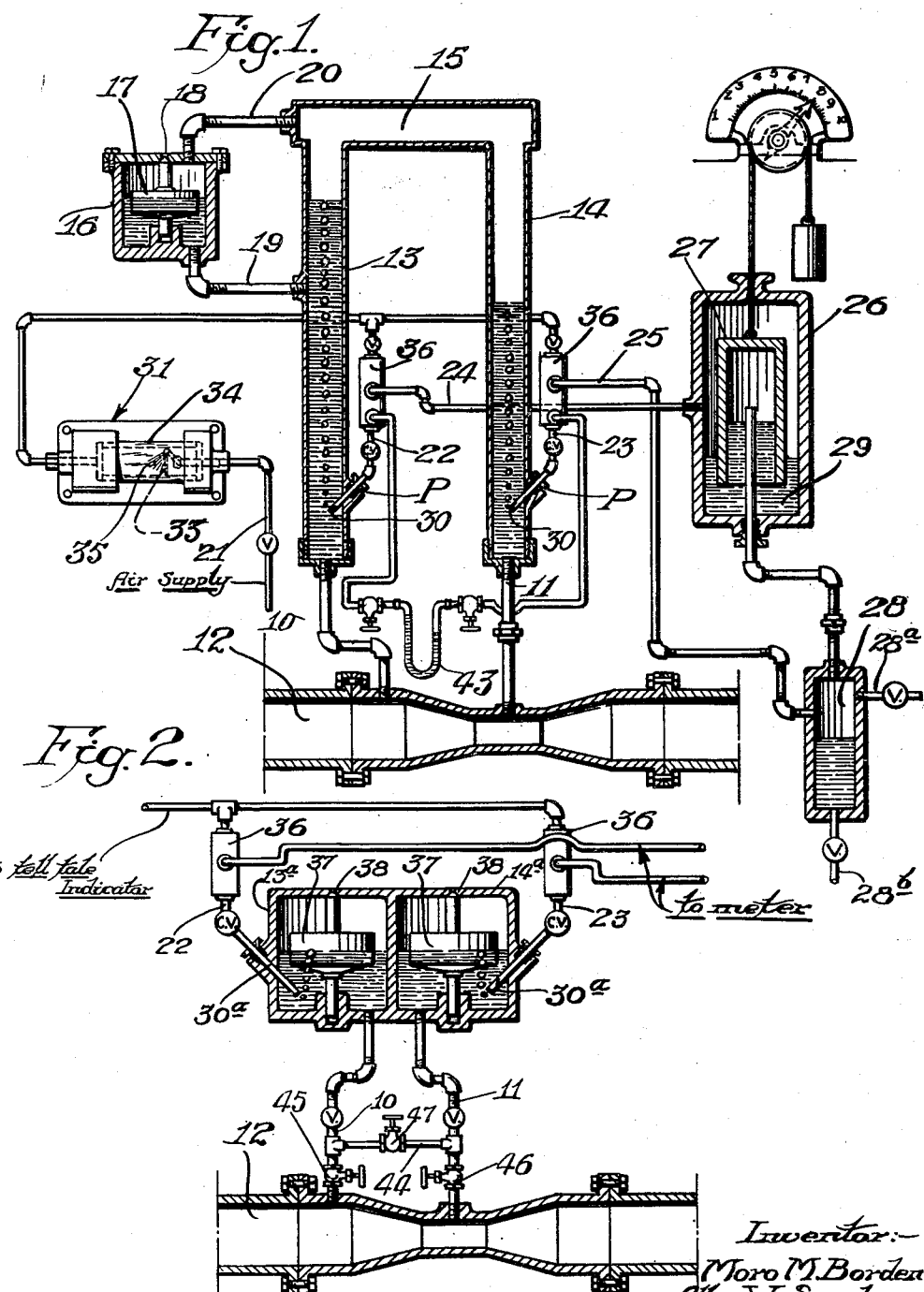

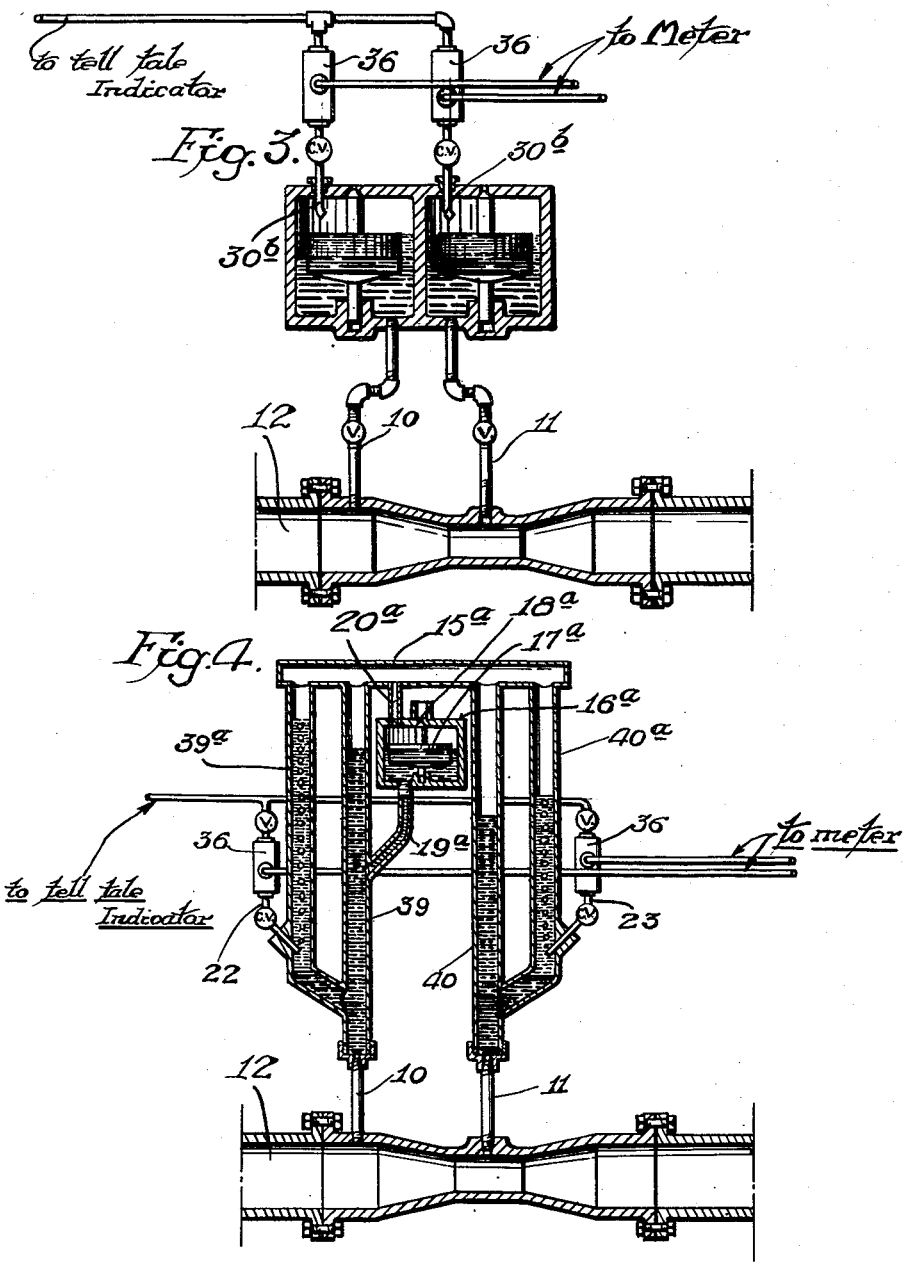

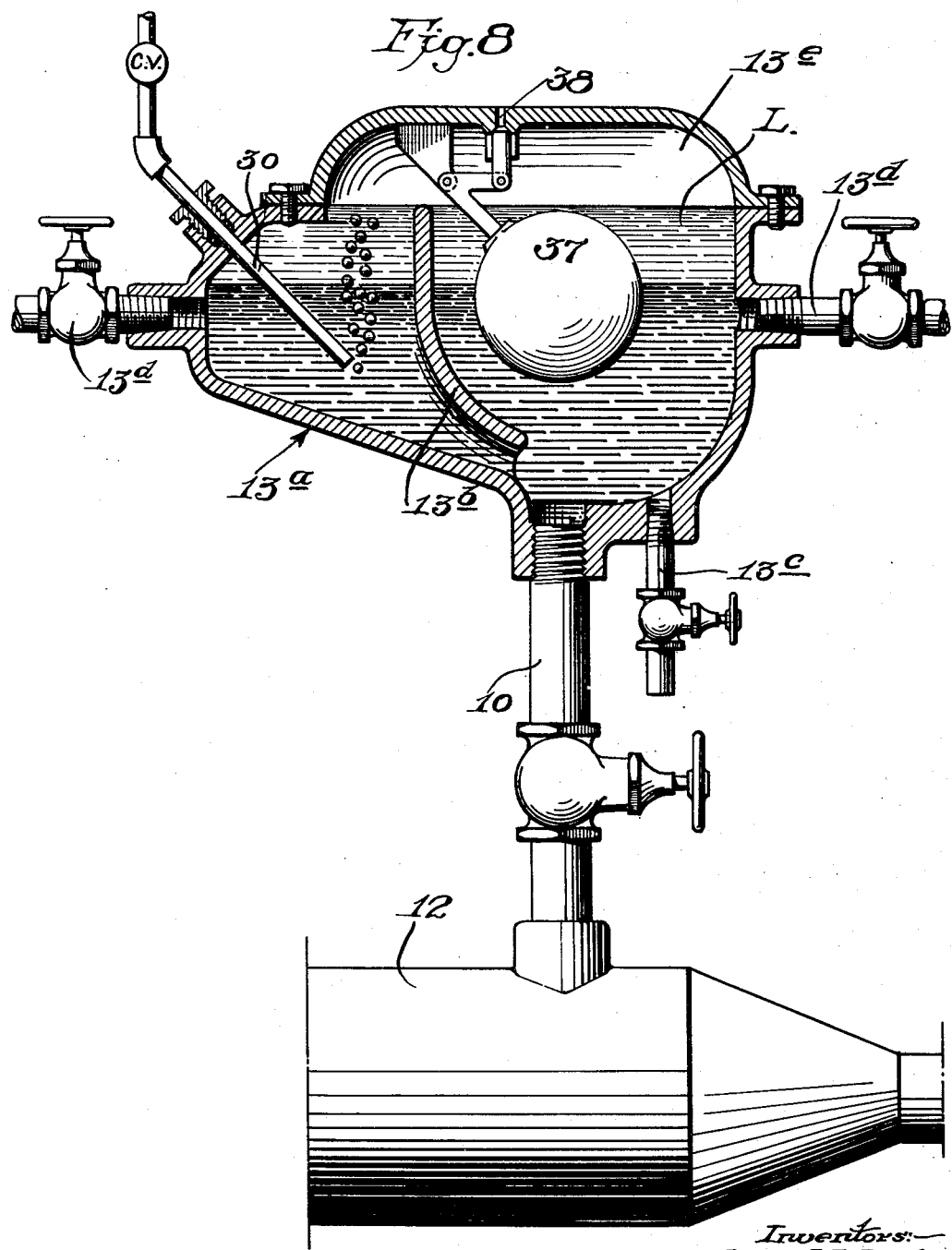

Patented July 29, 1941

2,250,700

UNITED STATES PATENT OFFICE 2,250,700

AIR-OPERATED METER

Moro M. Borden, Philadelphia, Pa., and Allen W. Sweeten, Pitman, N. J., assignors to Simplex Valve & Meter Company, Philadelphia, Pa., a corporation of Delaware Application July 16, 1938, Serial No. 219,628

10 Claims. (Cl. 73—205)

This invention relates to air-operated meters and, more particularly, to a metering arrangement wherein the meter is operated not directly by the liquid being metered but by fluid pressures determined by differential pressures resulting from the flow of such liquid through a suitable conduit.

In many instances the liquid which is to be metered is of such character that its direct introduction to the metering element itself is undesirable, while in other instances the question of convenience of location of the meter as respects the differential-by-flow mechanism operating the meter enters primarily into consideration. Often the flow conduit is located at a point removed from the desired location for the meter proper and under these circumstances some means of transmission other than the generated pressure differences must be employed. To this end we provide piezometer connections with zones of differential pressure generated through the flow of the liquid to be metered, and through suitable introduction of air or other gaseous fluid to these piezometers at proper points create pressure differentials which may be utilized at remote points for operation of the meter. The piezometers may be either of the elongated piezometer type or may be simply closed casings in which pressure differentials are generated equal to the differentials at the zones. The pressure differentials generated in these structures are conducted to the meter for operation thereof.

An important object of the invention is to provide convenient structures for the utilization of the generated pressure differentials at remote points.

A further object of the invention is the provision of means enabling the use of such gaseous pressure differential meters whereby the variation of the relative volumes of gas in the extended piezometers and in the metering instrument is counterbalanced so as to give prompt and correct action by means of an adjustable balancing chamber.

A further object of the invention is to provide a construction of this character which will enable free venting of accumulated air or gas within the flow conduit and in which the venting means is constructed to enable removal of any solids which might tend to collect therein.

These and other objects we attain by the construction shown in the accompanying drawings wherein, for the purpose of illustration, we have shown a preferred embodiment of our invention, and wherein:

Fig. 1 is a diagrammatic view partially in section showing metering apparatus constructed in accordance with our invention;

Fig. 2 illustrates a modification of the metering apparatus shown in Fig. 1;

Figs. 3, 4 and 5 are further modifications thereof;

Fig. 6 is a fragmentary elevation of one of the piezometer connections illustrating the visual indication of air flow therein;

Fig. 7 is a sectional view through the telltale mechanism employed in the metering apparatus; and Fig. 8 is a sectional view through the preferred form of venting chamber.

Referring now more particularly to the drawings, the numerals 10 and 11 indicate piezometer connections which communicate with a flow conduit 12 at points of differential pressure therein. These points of differential pressure may be generated in any suitable manner, as by means of an orifice, oppositely facing Pitot tubes, or a venturi, the latter being utilized for the purpose of illustration.

In Fig. 1, the piezometer connections 10 and 11 transmit pressures from the zones thus established to a pair of casings 13 and 14 which are connected at their upper ends through a manifold 15. A casing 16 containing a float valve 17 controlling an orifice 18 in the upper wall of the casing has its lower end connected through conduit 19 with a point having such communication with conduit 12 that the same liquid levels will be maintained in the casing 16 and one of casings 13 and 14, the former being utilized in the present instance for the purpose of illustration, and its upper end connected by a conduit 20 with a point above the liquid level in such casing. This conduit 19 may either communicate directly with one of the piezometer casings, as shown in Fig. 1, or may communicate directly with one of the pressure zones, as illustrated in Fig. 5 at 19a. In any case, connection with the conduit 12 is made at the top of the conduit since connection in this manner provides for complete venting of gases or air from the conduit. A source of gaseous fluid pressure 21 is provided with branches 22 and 23 communicating with the casings 13 and 14 at points below the liquid level therein and of common barometric pressure. The branches 22 and 23 have outlets 24 and 25 communicating with the proper points on a meter 26. In the present instance

tion of the bubbling action from the nozzle 30 associated with the casing.

In Fig. 8 we have illustrated a preferred construction for chambers of the type illustrated in Fig. 2. It will be noted that the chamber is provided with a baffle wall 13b arranged between the float 37 and the outlet end of the air supply pipe thus preventing any possible disturbance of the ball through action of the bubbles thereagainst. It will also be noted that the chamber is provided with a drain 13c and with liquid inlets 13d through which the chamber can be flushed to remove any solids which might tend to collect therein. We have also illustrated in this figure a preferred arrangement wherein the liquid from the conduit 12 has superimposed thereon a lighter liquid L thus reducing the volume of the air space 13e above the liquid in the casing. It will be understood that the use of this lighter liquid L may be resorted to in any of the remaining constructions illustrated.

In the several structures illustrated and described, it is the usual practice to have the outlet tips of the nozzles 30, 30a, and 30b at substantially the same horizontal level so that if there be equal friction flow losses in said nozzles and supply lines the differential gaseous pressures will be truly equal to the total differential pressures in the piezometers 13 and 14 or the casings 13a and 14a and the meter connected to said supply lines will accurately measure the total differential above such level. However, to allow for possible variations in friction flow losses in the different pressure lines and nozzles, the latter are preferably made adjustable so that the nozzle outlet levels may be varied with relation to one another, and the invention contemplates the provision of arrangements whereby the relative levels of the outlet tips of the nozzles 30, 30a and 30b may be accurately adjusted to compensate for variations in the friction losses in the flow of the gas from the manifold to the outlet tips of the nozzles and hence afford a correct setting or adjustment of the meter. This may obviously be accomplished by simply shifting a smooth tube through a packing gland P and securing it in position by jamming the gland. However, some means must be provided to ascertain when the proper adjustment has been secured.

One such arrangement is disclosed in Figure 1 of the drawings and consists in connecting a small U-tube manometer 43 across the manifolds 36. The flow of fluid in the conduit 12 is completely stopped in any suitable manner, such as by means of a valve (not shown) and air is passed through the nozzles 30 with the result that, liquid flow through conduit 12 being zero, any differential in the liquid levels in the manometer tube shows that the tips of the nozzles either are not at the same level or, if at the same level, that their friction flow losses are unequal. The nozzles 30 may thereupon be adjusted relative to one another until there is no differential in the levels of the U-tube manometer and when this has been done, the differential gaseous pressures will be equal to the total differential pressures in the piezometers 13 and 14, giving a correct zero adjustment or setting for the meter.

On the other hand, in instances where complete stoppage or cessation of flow in the conduit 12 cannot be effected, an arrangement such as is disclosed in Figure 2 of the drawings may be employed. This consists of an equalizing connection 44 between the pressure lines 10 and 11, controlled by means of valves 45, 46 and 47, whereby the same common pressure condition may be accomplished with liquid flowing through the conduit 12 by leaving valve 47 open and closing either valves 45 or 46.

As the structures illustrated and described are, obviously, merely examples of possible variations of our invention, we do not wish to be understood as limiting ourselves to any specific form thereof except as hereinafter claimed.

We claim:

1. In combination with a liquid flow conduit having means for establishing zones of different pressures therein definitely related to the rate of fluid flow in the conduit, a casing for and communicating with each zone, a source of gaseous fluid pressure having branches continuously discharging to said casings, a device responsive to pressure variations in said branches, and means responsive to the liquid pressures in said zones for venting gaseous fluid pressure from said casings to an area of lower pressure, the last-named means effectively dividing the casings into liquid and gaseous fluid areas, the gaseous fluid pressure being admitted to the gaseous fluid areas.

2. In combination with a liquid flow conduit having means for establishing zones of different pressures therein definitely related to the rate of flow in the conduit, a casing for and communicating with each zone, a source of gaseous fluid pressure having branches continuously discharging to said casings, a device responsive to pressure variations in said branches, and a float valve responsive to the liquid level in at least one of said casings for venting gaseous fluid pressure from said casings to an area of lower pressure.

3. In metering means of the class described, a fluid flow conduit having means establishing zones of different pressure therein, a piezometer tube communicating with each zone, a source of gaseous pressure, an outlet from said source for and continuously discharging into each piezometer tube, outlet means for said tubes communicating with an area of lower pressure than that of said source, valve means controlling said outlet means and operated by the liquid level in at least one of said tubes, and a device operated by the pressure differential in the outlets from said source.

4. In metering means of the class described, a fluid flow conduit having means establishing zones of different pressure therein, a piezometer tube communicating with each zone, a source of gaseous pressure, an outlet from said source for and continuously discharging into each piezometer tube, outlet means for said tubes communicating with an area of lower pressure than that of said source, valve means controlling said outlet means and operated by the balnce between liquid and gaseous pressures in at least one of said tubes, a meter operated by the pressure differential in the outlets from said source, and including a float chamber having an open-bottomed float providing internal and external pressure areas of different capacities, and a compensating chamber for equalizing the capacities of said pressure areas arranged in the connection between the area of lower capacity and the outlet discharging thereto.

5. The device of claim 3 wherein the outlets from the source of gaseous pressure are disposed at substantially the same horizontal level with respect to one another, and are adjustable relative to each other to compensate for differences in the flow friction losses therein.

6. A device as claimed in claim 3 wherein each piezometer tube comprises two branches, one containing the fluid of the conduit and the other a liquid column balanced by the pressure in said zone and the outlets from said source discharge into the last-named branches of the piezometers.

7. The device of claim 1 wherein a liquid lighter than that in the flow conduit is employed in the casings to reduce the dimensions of the gaseous fluid areas.

8. In metering means of the class described, a fluid flow conduit having means establishing zones of different pressure therein, a piezometer tube communicating with each zone, a source of gaseous pressure, an outlet from said source for and continuously discharging into each piezometer tube, outlet means for said tubes communicating with an area of lower pressure than that of said source, valve means controlling said outlet means and operated by the balance between liquid and gaseous pressures in at least one of said tubes, and a device operated by the pressure differential in the outlets from said source, said outlet for said gaseous pressure source being above the effective liquid level in said piezometer tubes.

9. In metering means of the class described, a fluid flow conduit having means establishing zones of different pressure therein, a piezometer tube communicating with each zone, a source of gaseous pressure, an outlet from said source for and continuously discharging into each piezometer tube, outlet means for said tubes communicating with an area of lower pressure than that of said source, valve means controlling said outlet means and operated by the balance between liquid and gaseous pressures in at least one of said tubes, and a device operated by the pressure differential in the outlets from said source, each piezometer tube comprising two branches one containing the fluid of the conduit and the other a liquid column balanced by the pressure in said zone, the outlets from said source discharging into the last-named branches of the piezometers.

10. In metering means of the class described, a fluid flow conduit having means establishing zones of different pressure therein, a piezometer tube communicating with each zone, a source of gaseous pressure, an outlet from said source for and continuously discharging into each piezometer tube, outlet means for said tubes communicating with an area of lower pressure than that of said source, valve means controlling said outlet means and operated by the balance between liquid and gaseous pressures in at least one of said tubes, and a device operated by the pressure differential in the outlets from said source, the outlets from the source of gaseous pressure being disposed at substantially the same horizontal level with respect to one another and being adjustable relative to each other to compensate for differences in the flow friction losses therein, the piezometer tubes having transparent portions permitting observation and adjustment of said outlets.

MORO M. BORDEN.
ALLEN W. SWEETEN.